Feb. 13, 1934. L. W. RIGGS 1,947,172
SHAFT SEAL
Filed Jan. 30, 1932
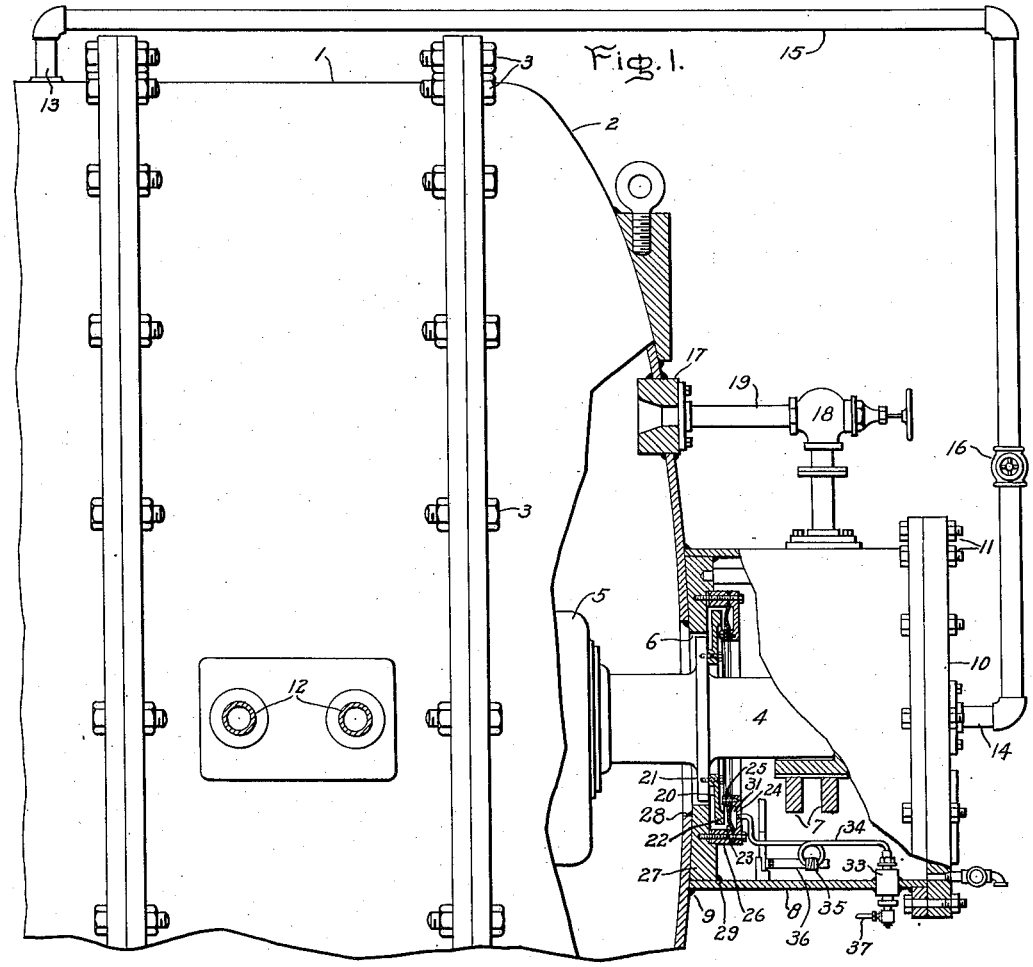
Inventor:
Leland W. Riggs,
by Charles E. Tulla
His Attorney.

Patented Feb. 13, 1934

1,947,172

UNITED STATES PATENT OFFICE 1,947,172

SHAFT SEAL

Leland W. Riggs, Schenectady, N. Y., assignor to General Electric Company, a corporation of New York Application January 30, 1932. Serial No. 589,899

3 Claims. (Cl. 286—11)

My invention relates to shaft seals.

The object of my invention is to provide a normally open sealing device for a shaft or other rotatable member of a machine, which can be readily closed when desired, so that continuous wearing of the seal during ordinary operation of the machine is avoided. I accomplish this by providing a seal having an elastic diaphragm, which is normally open during ordinary operation of the machine, and an arrangement for flexing the diaphragm to close the seal.

My invention will be more fully set forth in the following description, referring to the accompanying drawing, and the features of novelty which characterize my invention will be pointed out with particularity in the claims annexed to and forming a part of this specification.

In the drawing, Fig. 1 is a side elevation of a totally enclosed dynamo-electric machine embodying my invention, partly broken away to more clearly illustrate the construction; Fig. 2 is an enlarged fragmentary sectional view of the pneumatically operated device which I employ for sealing the opening between the shaft of the rotatable member of the machine and the end wall of the housing; and Fig. 3 is an enlarged fragmentary sectional view of the sealing device in a closed position.

Referring to the drawing, I have shown my invention as applied to a totally enclosed dynamo-electric machine. The stationary and rotatable members of this machine are enclosed by a cylindrical housing 1 having an end head 2 which is bolted thereto at 3. The current collecting devices of the machine are made readily accessible by extending a portion 4 of the shaft of the rotatable member from the bearing 5 through an opening 6, and arranging slip rings 7 thereon adjacent the opening. The slip rings are connected by current collecting devices to an external circuit in any suitable manner. The current collecting devices are enclosed in a gas tight casing 8 which is welded at 9 to the end head 2 of the housing and provided with a removable cover 10 bolted thereto at 11. A cooling gas such as hydrogen, for example, is circulated in any suitable manner within the machine to cool the stationary and rotatable members thereof, and passes over coolers through which cooling water is circulated from connections 12. The cooling gas is also circulated from the housing through the casing 8 by a connection 13 communicating with a high pressure portion of the housing 1, and communicating with the casing at 14 through pipe 15 and valve 16. The gas flows from the casing to the housing through a connection 17, a valve 18, and connection 19. When the valves 16 and 18 are closed and the space between the shaft and the housing is sealed, the cover 10 can be removed from the casing 8 without removing the gas from the housing. The foregoing described construction is the invention of Earle S. Henningsen and is described and claimed in his application, Serial No. 456,608, filed May 28, 1930, which is assigned to the assignee of this invention. My present invention is an improvement over the invention of this Henningsen application, which invention was made by said Earl S. Henningsen prior to my invention. I, therefore, do not hereby claim anything shown or described in said Henningsen application, which is to be regarded as prior art with respect to my present application.

In accordance with my invention I provide a normally open sealing device between the housing and the casing, and an arrangement for closing the seal, so that there will be no leakage of the cooling gas from the housing of the machine along the shaft when the casing is opened for inspection or adjustment of the current collecting devices. In this manner continuous wearing of the seal is avoided during ordinary operation of the machine.

In the particular construction illustrated in the drawing, the normally open seal comprises a rotatable element including an annular flange 20 secured to a shoulder 21 formed on the shaft 4. Adjacent the outer projecting portion 22 of the flange member 20, and normally out of contact therewith, is arranged a resilient wall in the form of an annular disk or diaphragm 23 of resilient material such as rubber, for example. The diaphragm 23 is secured at its inner periphery between the projecting inner edge of an annular plate 24 and a ring 25, and at its outer periphery between the projecting outer edge of the plate 24 and a ring 26. The disk 23 and plate 24 are supported about the opening 6 by securing the ring 26 to an annular member 27 welded at 28 to the end head 2, and welded at 29 to the casing 8. In this construction, when it is desired to remove the cover 10 of the casing 8 to adjust the current collecting devices, the disk 23 is forced into contact with the projection or shoulder 22 of the flange member 20 pneumatically. For this purpose I provide a conection 30 communicating with the annular space or chamber 31 formed by the disk 23 and plate 24, and communicating with a valve stem 32 outside the casing 8 through a connection 33 and tubing 34, which is secured at 35 to a bracket 36 supported within the casing. The valve stem 32 is provided with a valve for maintaining the pressure of air or other fluid within the space 31 and the tubing 34, and a dust cap 37.

During ordinary operation of the machine, the seal is normally open with the disk 23 in the position indicated in Fig. 2. The gas is circulated within the housing 1 and flows through the casing 8 through the pipe 15 and return connection 19. The gas is also free to flow through the opening 6 between the machine and the current collecting devices. When inspection or adjustment of the current collecting devices is required, the machine is stopped, and the valves 16 and 18 are closed. Sufficient air or other fluid is then supplied under pressure to the tubing 34 and space 31 through the valve stem 32 to expand the disk 23 and bring it into contact with the projection 22 of the flange member 20, as indicated in Fig. 3. The cover of the casing 8 can then be removed without any loss of gas from the housing along the shaft of the machine. After the current collecting devices are adjusted or replaced, the cover 10 is replaced, the fluid released from the disk 23, and operation of the machine can be resumed.

Although I have shown my invention embodied in a particular form of dynamo-electric machine, I do not desire to be limited thereto, nor to the specific arrangements disclosed, and I intend in the claims to cover all modifications which do not depart from the spirit and scope of my invention.

What I claim as new and desire to secure by Letters Patent of the United States, is,—

1. A shaft seal comprising a rotatable annular shoulder and a stationary structure including an annular flexible diaphragm arranged adjacent said rotatable shoulder and normally out of contact therewith, a plate supporting the inner and outer peripheries of said diaphragm and cooperating therewith to form a chamber, said diaphragm being arranged adajacent said shoulder, and means for supplying fluid to said chamber to extend said diaphragm into contact with said rotatable shoulder and thereby close said seal.

2. A shaft seal comprising a rotatable disk, a stationary plate adjacent said disk, an annular flexible diaphragm secured to said plate and normally out of contact with said disk, and means for supplying fluid to said diaphragm to extend the same into contact with said disk and thereby close said seal.

3. A shaft seal comprising a rotatable disk, a stationary plate adjacent said disk, an annular flexible diaphragm secured to said plate and normally out of contact with said disk, a stationary ring surrounding and spaced from said disk for supporting said plate, and means for supplying fluid to said diaphragm to extend the same into contact with said disk and thereby close said seal.

LELAND W. RIGGS.